United States Patent
Kato (10) Patent No.: US 9,106,096 B2
(45) Date of Patent: Aug. 11, 2015

(54) POWER TRANSMISSION APPARATUS, POWER TRANSMISSION DEVICE, POWER RECEPTION DEVICE, AND POWER TRANSMISSION METHOD

(71) Applicant: TOSHIBA TEC KABUSHIKI KAISHA, Shinagawa-ku, Tokyo (JP)

(72) Inventor: Masakazu Kato, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 372 days.

(21) Appl. No.: 13/649,165

(22) Filed: Oct. 11, 2012

(65) Prior Publication Data
US 2013/0099586 A1    Apr. 25, 2013

(30) Foreign Application Priority Data
Oct. 19, 2011   (JP) .................................. 2011-229864

(51) Int. Cl.
| | |
|---|---|
| H01F 38/14 | (2006.01) |
| H02J 7/02 | (2006.01) |
| H02J 7/00 | (2006.01) |

(52) U.S. Cl.
CPC ......... H02J 7/025 (2013.01); *H02J 2007/0096* (2013.01)

(58) Field of Classification Search
CPC ... H01F 38/14; B60L 11/182; B60L 11/1829; H02J 17/00; H02J 5/005; H02J 7/025
See application file for complete search history.

(56) References Cited

U.S. PATENT DOCUMENTS

| | | | |
|---|---|---|---|
| 7,741,734 B2 | 6/2010 | Joannopoulos et al. | |
| 7,825,543 B2 | 11/2010 | Karalis et al. | |
| 2011/0193417 A1 | 8/2011 | Hirasaka et al. | |
| 2011/0270462 A1 | 11/2011 | Amano et al. | |
| 2012/0056497 A1* | 3/2012 | Suzuki et al. | 307/149 |

FOREIGN PATENT DOCUMENTS

| | | |
|---|---|---|
| JP | 06-311658 | 11/1994 |
| JP | 2010-252498 | * 4/2009 |

(Continued)

OTHER PUBLICATIONS

Japanese Office Action for Japanese Patent Application No. 2011-229864 mailed on Sep. 17, 2013.

*Primary Examiner* — Rexford Barnie
*Assistant Examiner* — Terrence Willoughby
(74) *Attorney, Agent, or Firm* — Amin, Turocy & Watson, LLP (57) ABSTRACT

A power transmission apparatus includes a power transmission device having a power transmission amount detecting unit that transmits power and detects a power transmission amount, a power transmission device communication unit that communicates with a power reception device, and a power transmission device controller that calculates power transmission efficiency from the power transmission amount and a power reception amount and stops transmitting power if it is determined that a relationship between the power transmission amount and the power transmission efficiency lies out of an operable region, and the power reception device having a power reception amount detecting unit that receives power from the power transmission device and detects the power reception amount, a power reception device communication unit that communicates with the power transmission device, and a power reception device controller that transmits the power reception amount to the power transmission device via the power reception device communication unit.

9 Claims, 8 Drawing Sheets

(56) References Cited

FOREIGN PATENT DOCUMENTS

| JP | 2010-051137 | 3/2010 |
| JP | 2010-119246 | 5/2010 |
| JP | 2010-252498 | 11/2010 |
| WO | 2007008646 | 1/2007 |

* cited by examiner

| POWER TRANSMISSION EFFICIENCY E1 (%) | POWER TRANSMISSION AMOUNT Pt (W) |
|---|---|
| 0 | 10 |
| 10 | 11 |
| 20 | 13 |
| 30 | 14 |
| 40 | 17 |
| 50 | 20 |
| 60 | 25 |
| 70 | 33 |
| 80 | 50 |
| 90 | 100 |
| 100 | NO LIMIT |

POSITION OF POWER RECEPTION DEVICE IS DEVIATED. PLEASE PLACE AGAIN.

POWER TRANSMISSION AMOUNT: 20W
POWER TRANSMISSION EFFICIENCY: 50%

THERE ARE 50 MINUTES LEFT BEFORE CHARGING IS COMPLETED.

POWER TRANSMISSION AMOUNT: 20W
POWER TRANSMISSION EFFICIENCY: 80%

POWER TRANSMISSION APPARATUS, POWER TRANSMISSION DEVICE, POWER RECEPTION DEVICE, AND POWER TRANSMISSION METHOD

CROSS-REFERENCE TO RELATED APPLICATIONS

This application is based upon and claims the benefit of priority from the prior the Japanese Patent Application No. 2011-229864, filed on Oct. 19, 2011, and the entire contents of which are incorporated herein by reference.

FIELD

Embodiments described herein relate generally to a power transmission apparatus, a power transmission device, a power reception device, and a power transmission method.

BACKGROUND

In recent years, an apparatus which transmits power in a non-contact manner has been increasingly widespread. The power transmission apparatus includes a power transmission device which transmits power and a power reception device which receives the transmitted power. In addition, the power reception device includes a load such as a charging unit of a secondary battery.

The power transmission apparatus transmits power from the power transmission device to the power reception device using an electromagnetic induction method, a magnetic field resonance method, an electric field resonance method, or the like. In a power transmission apparatus using the electromagnetic induction method, the power transmission device and the power reception device are required to be close to each other in a transmittable region, and, on the other hand, in a power transmission apparatus using the magnetic field resonance method, the power reception device is installed in a transmittable region within several cm or several tens of cm from the power transmission device, and power can be transmitted.

Here, if the power reception device is out of a transmittable region where power of the power transmission device can be transmitted, that is, if the power transmission device transmits power in a state where power transmission efficiency is low, power which is not received is radiated into the space and thus has a harmful effect on human bodies or peripheral electronic apparatuses. In addition, power which is not transmitted is converted into heat, and thereby the power transmission device may emit heat or may catch fire in the worst case scenario.

In relation thereto, there is a technique in which the power transmission device and the power reception device are respectively provided with communication units, a power reception state is fed back from the power reception device to the power transmission device, the power transmission device transmits power if it is determined that the power reception device is set in the power transmission device, and the power transmission device stops transmitting power if the power reception device is released from the power transmission device.

However, in this technique, since a power transmittable state is determined merely based on the fact that the power reception device is set by communication, if the power reception device is separated from the power transmission device in a range where the power reception device is set in the power transmission device, particularly, if the power reception device is poorly set, radiation of power and heat emission due to a reduction in transmission efficiency cannot be prevented.

DETAILED DESCRIPTION

Throughout this description, the embodiments and examples shown should be considered as exemplars, rather than limitations on the apparatus and methods of the present invention.

Hereinafter, an embodiment of a power transmission apparatus, a power transmission device, a power reception device, and a power transmission method will be described in detail with reference to the drawings.

A power transmission apparatus according to the present embodiment includes a power transmission device having a power transmission unit that transmits power, a power transmission amount detecting unit that detects a power transmission amount transmitted by the power transmission unit, a power transmission device communication unit that performs communication, and a power transmission device controller that controls power transmission of the power transmission unit on the basis of power transmission efficiency calculated from the power transmission amount and a power reception amount input from the power transmission device communication unit; and a power reception device having a power reception unit that receives power, a load to which the power received by the power reception unit is input, a power reception amount detecting unit that detects the power reception amount from output power of the power reception unit, a power reception device communication unit that communicates with the power transmission device communication unit, and a power reception device controller that transmits the power reception amount to the power transmission device via the power reception device communication unit.

First Embodiment

Configuration of Power Transmission Apparatus

Figure 1:
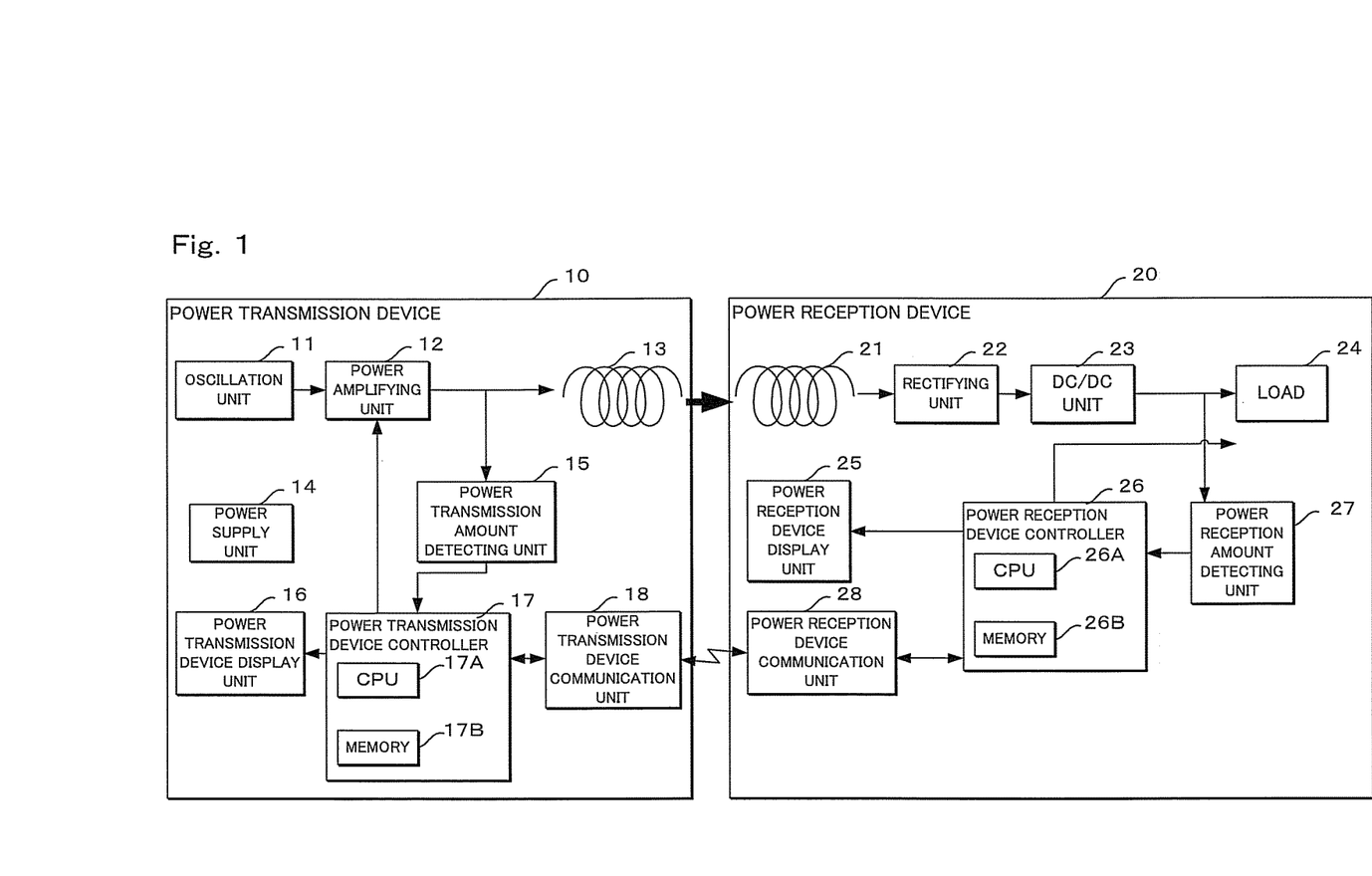
FIG. 1 is a block diagram illustrating a configuration of a power transmission apparatus according to a first embodiment.

FIG. 1 is a block diagram illustrating a configuration of a power transmission apparatus according to the present embodiment. As shown in FIG. 1, the power transmission apparatus includes a power transmission device 10 which transmits power and a power reception device 20 which receives the transmitted power. The power transmission device 10 and the power reception device 20 transmit power using, for example, an electromagnetic induction method or a magnetic field resonance method. A method of power transmission is not limited thereto. Hereinafter, a case of transmitting power using the electromagnetic induction method or the magnetic field resonance method will be described.

The power transmission device 10 includes an oscillation unit 11 which generates a high frequency signal, a power amplifying unit 12 which amplifies the generated high frequency signal, a power transmission coil 13 which transmits power amplified by the power amplifying unit 12, a power transmission amount detecting unit 15 which detects a transmission amount of the power amplified by the power amplifying unit 12, a power transmission device communication unit 18 which performs communication, and a power transmission device controller 17 which controls the power amplifying unit 12 on the basis of power transmission efficiency calculated from the power transmission amount input from the power transmission amount detecting unit 15 and a power reception amount input from the power transmission device communication unit 18, so as to control starting or stopping of power transmission and the power transmission amount.

Hereinafter, the oscillation unit 11, the power amplifying unit 12, and the power transmission coil 13 are referred to as a power transmission unit.

The power transmission device 10 further includes a power supply unit 14 which supplies power, and a power transmission device display unit 16 which displays information on the basis of an instruction from the power transmission device controller 17.

The power transmission amount detecting unit 15 extracts some of the power output from the power amplifying unit 12 using, for example, a directional coupler, and detects power, thereby detecting the power transmission amount. Alternatively, the power transmission amount detecting unit 15 has a resistor inserted in series or in parallel into an output end, and detects a power transmission current or a power transmission voltage from a voltage across the resistor, thereby detecting the power transmission amount.

The power transmission device controller 17 includes a CPU 17A which is an operating device and a memory 17B which is a storage device. The memory 17B stores a threshold value Th.

The power transmission device display unit 16 may be a liquid crystal display or an input and output device such as a touch panel.

The power transmission device communication unit 18 has an interface which communicates with a power reception device communication unit 28 using an electric signal such as an electric wave, or an optical signal.

The power transmission device controller 17 may be configured to start communication after authentication of a communication partner in order to perform communication via the power transmission device communication unit 18.

The power reception device 20 includes a power reception coil 21 which receives power, a rectifying unit which rectifies the power received by the power reception coil 21 into DC, a DC/DC unit 23 which converts a voltage, a load 24 to which power of the voltage converted by the DC/DC unit 23 is input, a power reception amount detecting unit 27 which detects a power reception amount from the output power of the DC/DC unit 23, the power reception device communication unit 28 which communicates with the power transmission device communication unit 18, and a power reception device controller 26 which transmits the power reception amount detected by the power reception amount detecting unit 27 to the power transmission device communication unit 18 via the power reception device communication unit 28.

Hereinafter, the power reception coil 21, the rectifying unit 22, and the DC/DC unit 23 are referred to as a power reception unit.

The power reception device 20 further includes a power reception device display unit 25 which displays information on the basis of an instruction from the power reception device controller 26.

The power reception amount detecting unit 27 detects power received by the power reception device 20 of power transmitted from the power transmission device 10. The power reception amount detecting unit 27 extracts, for example, a portion of an output of the DC/DC unit 23, and detects a power reception amount by detecting a power reception current or a power reception voltage from a voltage across a resistor inserted in series or in parallel into an output end.

The power reception device controller 26 includes a CPU 26A which is an operating device and a memory 26B which is a storage device.

The power reception device display unit 25 may be a liquid crystal display or may be an input and output device such as a touch panel.

The power reception device communication unit 28 has an interface which communicates with the power transmission device communication unit 18 using an electric signal such as an electric wave, or an optical signal.

The power reception device controller 26 may be configured to start communication after authentication of a communication partner in order to perform communication via the power reception device communication unit 28.

Operation of Power Transmission Apparatus

The power transmission device controller 17 calculates power transmission efficiency E1 from a power transmission amount detected by the power transmission amount detecting unit 15, and a power reception amount which is detected by the power reception amount detecting unit 27 and is received via the power transmission device communication unit 18, and controls the power amplifying unit 12 so as to stop power transmission if power which is transmitted and not received exceeds a threshold value on the basis of the power transmission efficiency and the power transmission amount.

First, the power transmission device controller 17 stores a power transmission amount Pt detected by the power transmission amount detecting unit 15 in the memory 17B. Next, a power reception amount Pr received via the power transmission device communication unit 18 is stored in the memory 17B. In addition, the power transmission efficiency E1 is calculated according to the following Expression (1).

$$\text{Power transmission efficiency } E1(\%) = (Pr/Pt) \times 100 \quad (1)$$

The power transmission device controller 17 may continuously calculate the power transmission efficiency E1. In addition, the power transmission device controller 17 may calculate the power transmission efficiency E1 for each constant time or for each event such as starting of power transmission.

Figure 2:
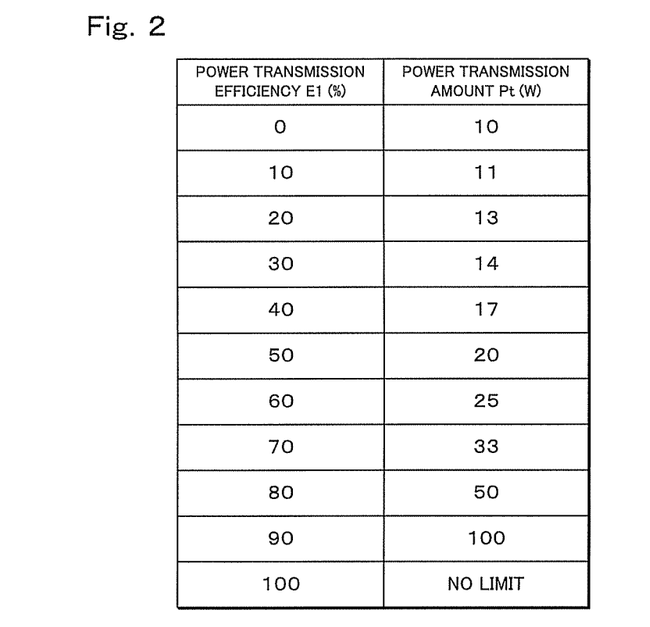
FIG. 2 is a diagram illustrating a relationship between power transmission efficiency E1 and a power transmission amount Pt if a threshold value is 10 W.
Figure 3:
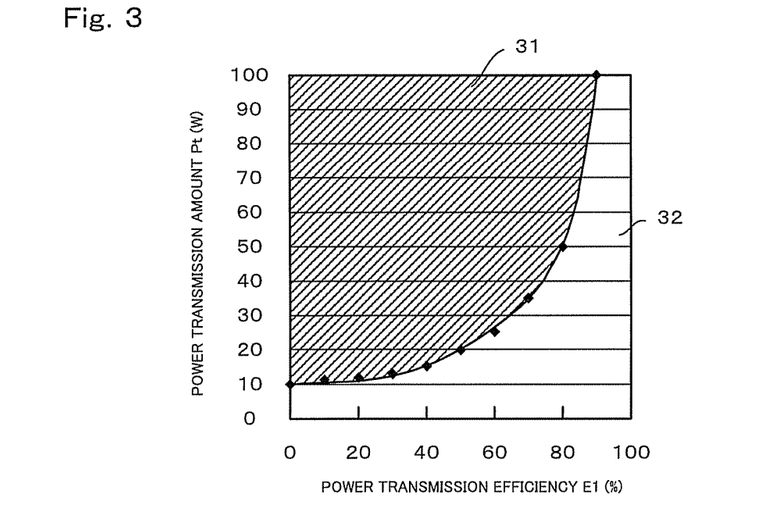
FIG. 3 is a graph illustrating the relationship between the power transmission efficiency E1 and the power transmission amount Pt if the threshold value is 10 W.

FIG. 2 is a diagram illustrating a relationship between the power transmission efficiency E1 and the power transmission amount Pt if the threshold value is 10 W. In addition, FIG. 3 is a graph illustrating the relationship between the power transmission efficiency E1 and the power transmission amount Pt if the threshold value is 10 W. In FIG. 3, the longitudinal axis indicates the power transmission amount Pt (W), and the transverse axis indicates the power transmission efficiency E1(%).

As shown in FIGS. 2 and 3, a condition that power which is transmitted and not received of, that is, a power transmission loss P1 is equal to or less than the threshold value is defined by the power transmission efficiency E1 and the power transmission amount Pt. An operable region which is a region 32 where the power transmission loss P1 is equal to or less than the threshold value is defined by the following Expression (2).

$$P1 = Pt - Pt \times (E1/100) \leq Th \qquad (2)$$

A modification of this Expression gives the following Expression (3).

$$Pt \leq (100 \times Th)/(100 - E1) \qquad (3)$$

The operable region in FIG. 3 is a region satisfying Expression (3). If the power transmission efficiency E1 and the power transmission amount Pt are placed in an inoperable region which is a region 31 not satisfying Expression (3), indicated by diagonal lines in FIG. 3, the power transmission device controller 17 controls the power amplifying unit 12 so as to stop power transmission.

Figure 4:
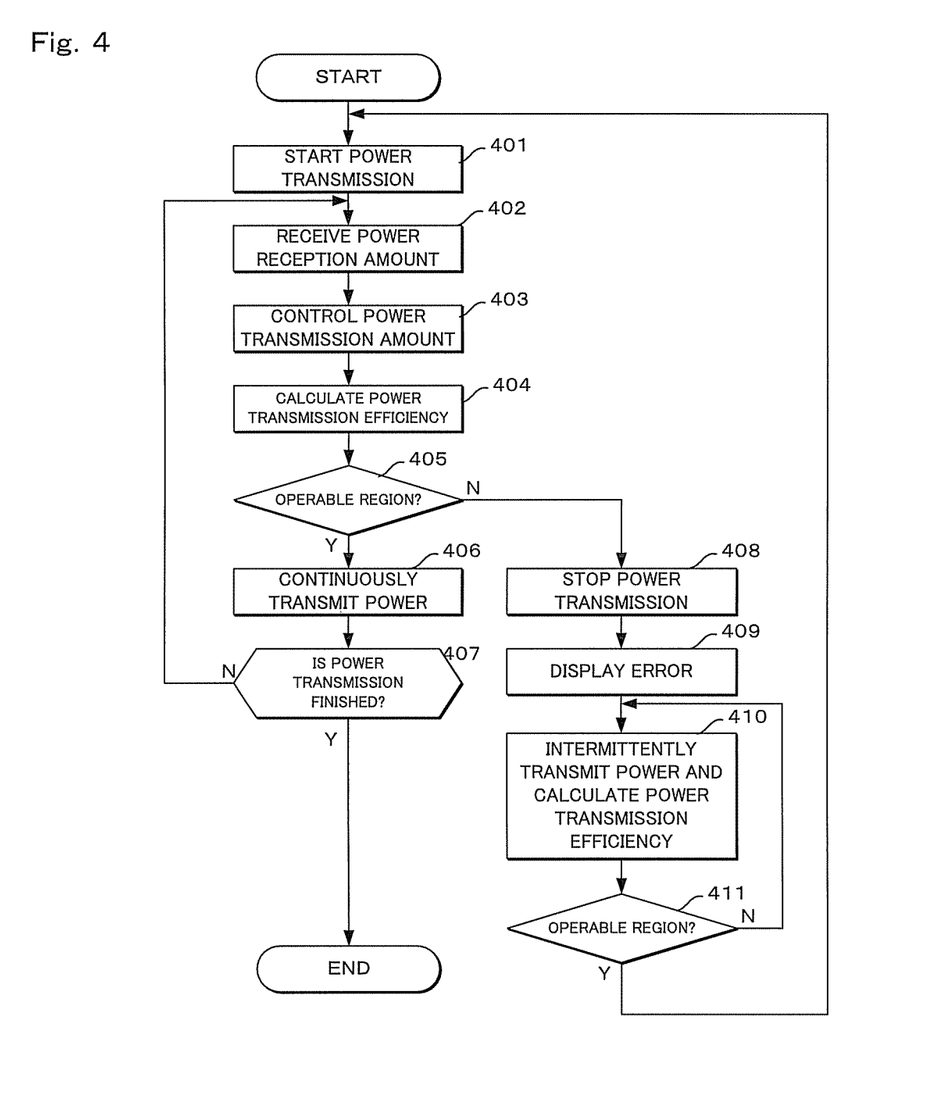
FIG. 4 is a flowchart illustrating an operation of a power transmission device of the power transmission apparatus.

FIG. 4 is a flowchart illustrating an operation of the power transmission device 10 of the power transmission apparatus. As shown in FIG. 4, in ACT 401, the power transmission device 10 starts power transmission.

In ACT 402, the power transmission device 10 receives the power reception amount Pr from the power reception device 20 via the power transmission device communication unit 18.

In ACT 403, the power transmission device 10 controls a power transmission amount, for example, as follows. The power transmission amount Pt is reduced in a range where the power reception amount Pr is not lower than an operation voltage of the load 24. If the power reception amount Pr is reduced, the power transmission amount Pt increases.

In ACT 404, the power transmission device 10 calculates the power transmission efficiency E1 from the power transmission amount Pt and the power reception amount Pr.

In ACT 405, the power transmission device 10 determines whether or not the relationship between the power transmission amount Pt and the power transmission efficiency E1 lies in the operable region. If it is determined that the relationship between the power transmission amount Pt and the power transmission efficiency E1 lies in the operable region, the power transmission device 10 proceeds to ACT 406, and, if it is not in the operable region, the power transmission device 10 proceeds to ACT 408.

In ACT 406, the power transmission device 10 continuously transmits power.

In ACT 407, the power transmission device 10 determines whether or not a condition for finishing power transmission is satisfied, for example, a signal indicating full charge is received. If it is determined that the condition for finishing power transmission is satisfied, the power transmission device 10 finishes the process, and if it is determined that the condition for finishing power transmission is not satisfied, the power transmission device 10 proceeds to ACT 402.

For example, if the load 24 is a secondary battery, when the load 24 detects a current value indicating full charge, the load 24 transmits a signal indicating the full charge to the power reception device controller 26, and the power reception device controller 26 transmits the signal indicating the full charge to the power transmission device 10 via the power reception device communication unit 28.

Alternatively, if a power reception amount detected by the power reception amount detecting unit 27 conforms to a power reception amount of a full charge state, the power reception device controller 26 may detect full charge. When receiving the signal indicating the full charge, the power transmission device 10 stops the power transmission and finishes the process.

In ACT 408, the power transmission device 10 stops transmitting power.

In ACT 409, the power transmission device 10 displays the occurrence of errors on the power transmission device display unit 16.

In ACT 410, the power transmission device 10 intermittently transmits power and calculates the power transmission efficiency E1. The power transmission in this case is performed, for example, once every 10 seconds, that is, at the interval of 100 ms.

In ACT 411, the power transmission device 10 determines whether or not the relationship between the power transmission amount Pt and the power transmission efficiency E1 lies in the operable region. If it is determined that the relationship between the power transmission amount Pt and the power transmission efficiency E1 lies in the operable region, the power transmission device 10 returns to ACT 401, and, if it is not in the operable region, the power transmission device 10 returns to ACT 410.

Figure 5:
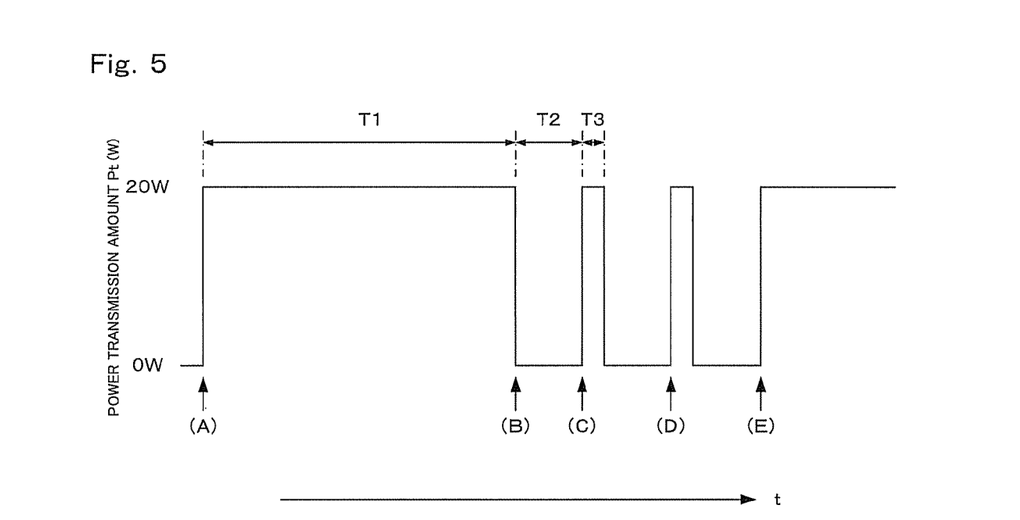
FIG. 5 is a timing chart illustrating timing of power transmission and stopping of power transmission.

FIG. 5 is a timing chart illustrating timing of power transmission and stopping of power transmission. As shown in FIG. 5, at a point (A), the power transmission device 10 starts power transmission, and, transmits power of, for example, 20 W for a duration T1.

At a point (B), the power transmission device 10 determines that the relationship between the power transmission amount Pt and the power transmission efficiency E1 is deviated from the operable region and stops the power transmission.

At a point (C) when a duration T2, for example, 10 seconds has elapsed from the point (B), the power transmission device 10 transmits power for a duration T3, for example, 100 ms, and determines whether or not the relationship between the power transmission amount Pt and the power transmission efficiency E1 lies in the operable region. If it is determined that the relationship between the power transmission amount Pt and the power transmission efficiency E1 is deviated from the operable region, the power transmission device 10 stops power transmission for the duration T2, and, then, at a point (D), transmits power again for the duration T3.

At a point (E), if it is determined that the relationship between the power transmission amount Pt and the power transmission efficiency E1 lies in the operable region, the power transmission device 10 resumes power transmission.

Figure 6:
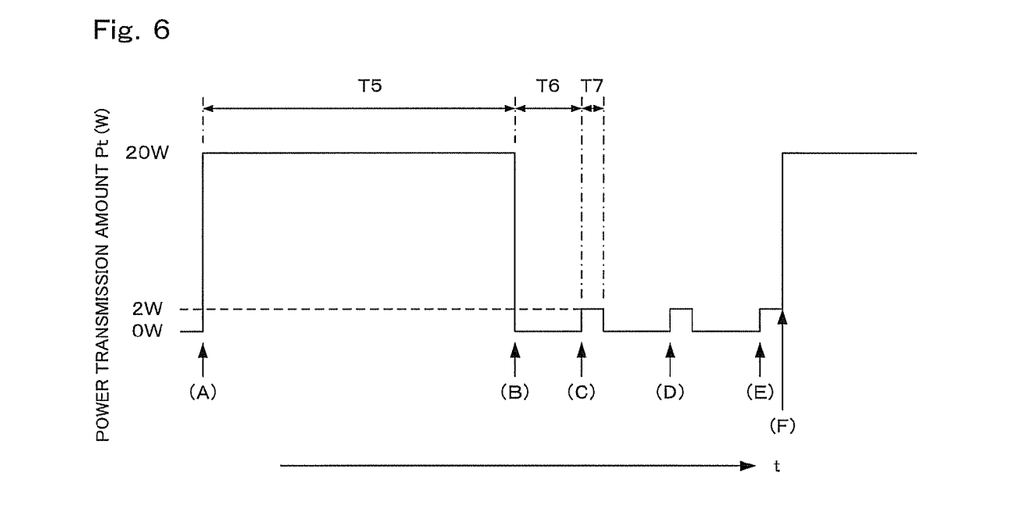
FIG. 6 is a timing chart illustrating timing of power transmission and stopping of power transmission according to an application example.

FIG. 6 is a timing chart illustrating timing of power transmission and stopping of power transmission according to an application example. As shown in FIG. 6, the power transmission device 10 starts power transmission at the point (A), and transmits power of, for example, 20 W for a duration T5.

At the point (B), the power transmission device 10 determines that the relationship between the power transmission amount Pt and the power transmission efficiency E1 is deviated from the operable region, and stops the power transmission.

At the point (C) when a duration T6, for example, 10 seconds has elapsed from the point (B), the power transmission device 10 transmits power for a duration T7, for example, 100 ms, at lower than normal power which is sufficient power to supply an operation voltage where the power transmission device 10 normally operates, for example, power of 1/10 to 1/20 of a case where power is continuously transmitted. In the example shown in FIG. 6, as an example, inspection power of 2 W which is power of 1/10 is transmitted, and it is determined that the relationship between the power transmission amount Pt and the power transmission efficiency E1 lies in the operable region.

If it is determined that the relationship between the power transmission amount Pt and the power transmission efficiency E1 is deviated from the operable region, the power transmission device 10 further stops power transmission for the duration T6, and, then, at the point (D), transmits the inspection power again for the duration T7.

At the point (E), if it is determined that the relationship between the power transmission amount Pt and the power transmission efficiency E1 lies in the operable region, the power transmission device 10 transmits power of 20 W again which is the normal power at a point (F).

Effects of First Embodiment

As described above, the power transmission apparatus according to the present embodiment includes the power transmission device 10 having the power transmission amount detecting unit 15 which transmits power and detects the power transmission amount Pt, the power transmission device communication unit 18 which communicates with the power reception device 20, and the power transmission device controller 17 which calculates the power transmission efficiency E1 from the power transmission amount Pt and the power reception amount Pr received from the power reception device 20, and stops transmitting power if it is determined that the relationship between the power transmission amount Pt and the power transmission efficiency E1 does not lie in the operable region, and, the power reception device 20 having the power reception amount detecting unit 27 which receives power from the power transmission device 10 and detects the power reception amount Pr, the power reception device communication unit 28 which communicates with the power transmission device 10, and the power reception device controller 26 which transmits the power reception amount Pr to the power transmission device 10 via the power reception device communication unit 28.

Therefore, there is an effect capable of preventing radiation of power and heat emission of the power transmission device due to reduction in the power transmission efficiency.

Second Embodiment

Configuration of Power Transmission Apparatus

Figure 7:
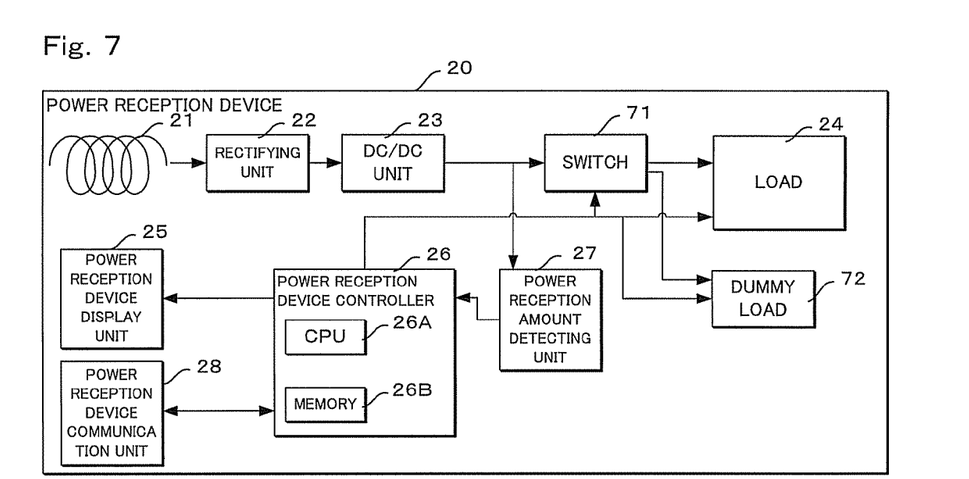
FIG. 7 is a block diagram illustrating a configuration of a power reception device of a power transmission apparatus according to a second embodiment.

FIG. 7 is a block diagram illustrating a configuration of a power reception device 20 of a power transmission apparatus according to the present embodiment. The power transmission apparatus includes a power transmission device 10 which transmits power and the power reception device 20 which receives the transmitted power. A configuration of the power transmission device is the same as the configuration of the power transmission device 10 according to the first embodiment.

As shown in FIGS. 1 and 7, the power transmission device 10 shown in FIG. 1 and the power reception device 20 shown in FIG. 7 transmit power using, for example, an electromagnetic induction method or a magnetic field resonance method. A transmission method of power is not limited thereto. Hereinafter, a case of transmitting power using the electromagnetic induction method or the magnetic field resonance method will be described.

The power transmission device 10 includes an oscillation unit 11 which generates a high frequency signal, a power amplifying unit 12 which amplifies the generated high frequency signal, a power transmission coil 13 which transmits power amplified by the power amplifying unit 12, a power transmission amount detecting unit 15 which detects a power transmission amount of the power amplified by the power amplifying unit 12, a power transmission device communication unit 18 which performs communication, and a power transmission device controller 17 which controls the power amplifying unit 12 on the basis of power transmission efficiency calculated from the power transmission amount input from the power transmission amount detecting unit 15 and a power reception amount input from the power transmission device communication unit 18, so as to control starting or stopping of power transmission and the power transmission amount, and which generates a control signal for controlling an operation of the power reception device 20.

The power transmission device 10 further includes a power supply unit 14 which supplies power, and a power transmission device display unit 16 which displays information on the basis of an instruction from the power transmission device controller 17.

The power transmission amount detecting unit 15 extracts some of power output from the power amplifying unit 12 using, for example, a directional coupler, and detects power, thereby detecting the power transmission amount. Alternatively, the power transmission amount detecting unit 15 has a resistor inserted in series or in parallel into an output end, and detects a power transmission current or a power transmission voltage from a voltage across the resistor, thereby detecting the power transmission amount.

The power transmission device controller 17 includes a CPU 17A which is an operating device and a memory 17B which is a storage device. The memory 17B stores a threshold value Th.

The power transmission device display unit 16 may be a liquid crystal display or an input and output device such as a touch panel.

The power transmission device communication unit 18 has an interface which communicates with a power reception device communication unit 28 using an electric signal such as an electric wave, or an optical signal.

The power transmission device controller 17 may be configured to start communication after authentication of a communication partner in order to perform communication via the power transmission device communication unit 18.

The power reception device 20 includes a power reception coil 21 which receives power, a rectifying unit which rectifies the power received by the power reception coil 21 into DC, a DC/DC unit 23 which converts a voltage, a load 24 to which power with the voltage converted by the DC/DC unit 23 is input, a dummy load 72 of which a load resistance value varies, a switch 71 which changes an output destination of the DC/DC unit 23 to either the load 24 or the dummy load 72, a power reception amount detecting unit 27 which detects a power reception amount from output power of the DC/DC unit 23, the power reception device communication unit 28 which communicates with the power transmission device communication unit 18, and a power reception device controller 26 which transmits the power reception amount detected by the power reception amount detecting unit 27 to the power transmission device communication unit 18 via the power reception device communication unit 28, and varies the load resistance value of the dummy load 72 by controlling the switch 71 on the basis of an output voltage value of the DC/DC unit 23 detected by the power reception amount detecting unit 27.

The power reception device 20 further includes a power reception device display unit 25 which displays information on the basis of an instruction from the power reception device controller 26.

The power reception amount detecting unit 27 detects power received by the power reception device 20 of power transmitted from the power transmission device 10. The power reception amount detecting unit 27 extracts, for example, a portion of an output of the DC/DC unit 23, and detects the power reception amount by detecting a power transmission current or a power transmission voltage from a voltage across a resistor inserted in series or in parallel into an output end.

The power reception device controller 26 includes a CPU 26A which is an operating device and a memory 26B which is a storage device.

The power reception device display unit 25 may be a liquid crystal display or may be an input and output device such as a touch panel.

The power reception device communication unit 28 has an interface which communicates with the power transmission device communication unit 18 using an electric signal such as an electric wave, or an optical signal.

The power reception device controller 26 may be configured to start communication after authentication of a communication partner in order to perform communication via the power reception device communication unit 28.

Figure 8:
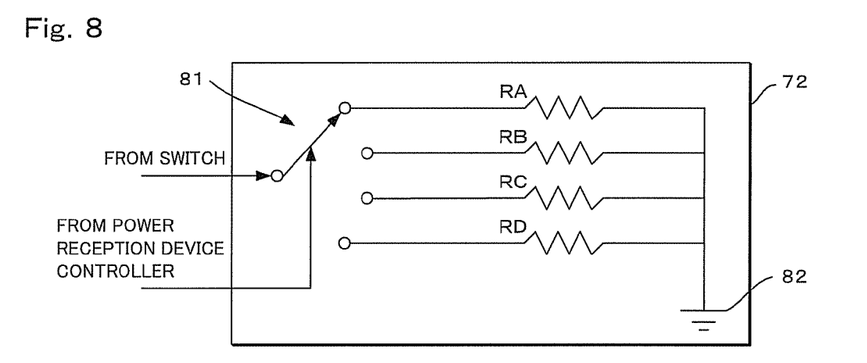
FIG. 8 is a diagram illustrating a configuration of a dummy load.

FIG. 8 is a diagram illustrating a configuration of the dummy load 72. As shown in FIG. 8, the dummy load 72 includes resistors RA to RD which have a plurality of different resistance values and are connected to a ground 82, and a changing unit 81 which changes an input from the switch 71 to connections of the resistors RA to RD in response to an instruction from the power reception device controller 26.

Table 1 is a table illustrating a relationship between a power reception amount Pr and power transmission efficiency E1 if a power transmission amount Pt is 2 W, and an output of the DC/DC unit 23 is 10 V.

TABLE 1

| RESISTANCE VALUE | POWER RECEPTION AMOUNT (W) | POWER TRANSMISSION EFFICIENCY E1 (%) |
|---|---|---|
| 50 Ω (RESISTOR RA) | 2 | 100 |
| 100 Ω (RESISTOR RB) | 1 | 50 |
| 200 Ω (RESISTOR RC) | 0.5 | 25 |
| 400 Ω (RESISTOR RD) | 0.25 | 12.5 |

For example, if a resistance value of 50Ω is selected, a power reception amount 2 W is obtained at power transmission efficiency E1 of 100%, the power transmission efficiency E1 of 100% can be scarcely achieved in practice in a case where power is transmitted in a non-contact manner. If the power transmission efficiency of 100% can be achieved, the DC/DC unit 23 outputs 10 V, and the voltage 10 V is developed across the resistor RA of 50Ω. At this time, a current flowing through the resistor RA becomes 10 V/50Ω=0.2 A. In other words, power of 10 V×0.2 A=2 W is received.

In practice, efficiency of 100%, that is, power 2 W is barely received due to non-contact power transmission, and thus a voltage across the resistor RA is lower than 10V. Since the DC/DC unit 23 is designed to output 10 V, under the circumstances where an output of the DC/DC unit 23 is lower than 10 V, an operation of the DC/DC unit may become unstable, and thus an accurate power reception amount is not easy to grasp. Therefore, if a voltage across the resistor RA is lower than 10 V, the connection of the switch 71 is controlled to be changed to the resistor RB.

When the predetermined voltage 10 V cannot be obtained even if the connection is changed to the resistor RB, the connection is further changed to the resistor RC and the resistor RD, and the power transmission efficiency E1 is calculated from a power reception amount at a resistance value selected when the predetermined voltage 10 V can be obtained.

Values and the number of resistors may be appropriately selected in accordance with systems. For example, if power transmission efficiency E1 of approximately 50% is desired to be detected using three kinds of resistors, a configuration as in the following Table 2 may be selected.

TABLE 2

| RESISTANCE VALUE | POWER RECEPTION AMOUNT (W) | POWER TRANSMISSION EFFICIENCY E1 (%) |
|---|---|---|
| 110 Ω (RESISTOR RA) | 0.91 | 45.5 |
| 100 Ω (RESISTOR RB) | 1 | 50 |
| 90 Ω (RESISTOR RC) | 1.11 | 55.5 |

Under the circumstances where a rated output (10 V in the present embodiment) of the DC/DC unit 23 cannot be obtained depending on the magnitude of the resistance value used in the dummy load 72, an operation of the DC/DC unit 23 may become unstable. Therefore, in the example shown in Table 2, if the resistor RC (90Ω) is selected and an output of the DC/DC unit 23 is lower than 10 V, control for changing to the resistor RB (100Ω) so as to measure efficiency may be required.

In addition, conversely, even if the resistor RA (110Ω) is selected and efficiency of 45.5% is calculated, there are cases of exceeding 50% in practice. This is because an output of the DC/DC unit 23 is not equal to or more than 10 V and thus a power reception amount of the resistor RA is only 0.91 W at most. In this case, a method of changing to the resistor RB so as to calculate efficiency again may be employed.

The above description relates to a selection example and theoretical values of the resistors, and, an appropriate resistor which exists in the load 24 may be selected in a practical operation. In addition, in the practical operation, the above-described power transmission efficiency E1 is not satisfied depending on the load 24 in some cases. In this case as well, an appropriate resistor may be selected.

Figure 9:
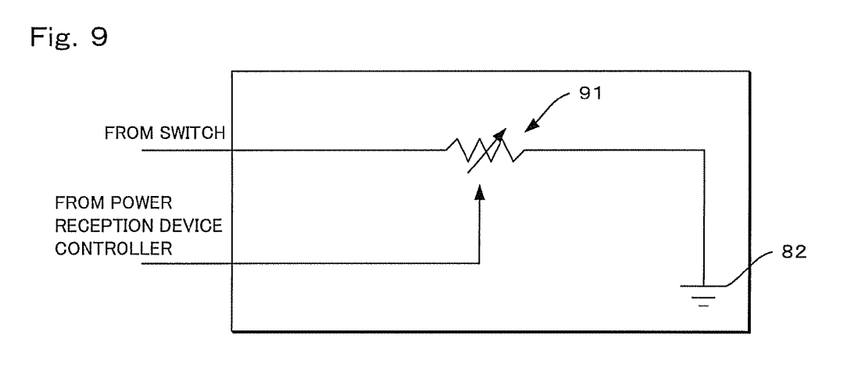
FIG. 9 is a diagram illustrating a configuration of a dummy load according to an application example.

FIG. 9 is a diagram illustrating a configuration of the dummy load 72 according to an application example. As shown in FIG. 9, the dummy load 72 may include a single variable resistor 91 instead of the plurality of resistors.

The variable resistor 91 varies its resistance value in response to an instruction from the power reception device controller 26.

Since the use of the variable resistor 91 enables the resistance value to continuously vary, it is possible to calculate the power transmission efficiency E1 more accurately.

Operation of Power Transmission Apparatus

The power transmission device controller 17 calculates the power transmission efficiency E1 from the power transmission amount detected by the power transmission amount detecting unit 15, and the power reception amount which is detected by the power reception amount detecting unit 27 and the power reception device controller 26 changing a load of the dummy load 72 and is received via the power transmission device communication unit 18, and controls the power amplifying unit 12 so as to stop power transmission if power which is transmitted and not received exceeds a threshold value on the basis of the power transmission efficiency and the power transmission amount.

If the inspection power lower than the normal power is transmitted so as to calculate the power transmission efficiency E1 in the first embodiment, there are cases where, since the inspection power cannot supply the operation voltage of the load 24, an operation of the load 24 becomes unstable or the load 24 stops an operation, and thereby the power reception amount Pr cannot be detected accurately.

In order to solve this problem, in the present embodiment, when the power transmission efficiency E1 is calculated, connections of the switch 71 are changed such that the DC/DC unit 23 is connected to the dummy load 72 depending on a control signal which is received by the power reception device controller 26 of the power reception device 20 and an output voltage of the DC/DC unit 23 detected by the power reception amount detecting unit 27, and, further, the power reception amount Pr is detected by varying a load of the dummy load 72.

A description thereof will be made with reference to the timing chart of FIG. 6. As shown in FIG. 6, the power transmission device 10 starts power transmission at the point (A), and transmits power of, for example, 20 W for the duration T5.

At the point (B), the power transmission device 10 determines that the relationship between the power transmission amount Pt and the power transmission efficiency E1 is deviated from the operable region, and stops the power transmission.

At the point (C) when the duration T6, for example, 10 seconds, has elapsed from the point (B), the power transmission device 10 transmits power for the duration T7, for example, 100 ms, lower than normal power which is power sufficient to supply an operation voltage where the power transmission device 10 normally operates, for example, power of 1/10 to 1/20 of a case where power is continuously transmitted. In the example shown in FIG. 6, as an example, inspection power of 2 W which is power of 1/10 is transmitted, and it is determined that the relationship between the power transmission amount Pt and the power transmission efficiency E1 lies in the operable region.

The power transmission device 10 sends the power transmission amount Pt from the point (C) until normal power is transmitted again, to the power reception device controller 26 of the power reception device 20 via the power transmission device communication unit 18. In addition, the power transmission amount Pt may be sent at the point (C) or may be sent at any timing before the point (B).

The power reception device 20 receives the power transmission amount Pt which is lower than a case where power is continuously transmitted, in the present embodiment, 1/10 thereof, and controls the switch 71 such that an output of the DC/DC unit 23 is connected to the dummy load. The resistance value RA is selected in the dummy load 72. Here, RA<RB<RC<RD.

The power reception amount detecting unit 27 detects a voltage output by the DC/DC unit 23 and checks whether or not a rated value (10 V in the present embodiment) of the DC/DC unit 23 is output. If the rated value is lower than 10 V, the resistance value is sequentially changed from RA to RB to RD, the resistance value which outputs 10 V is selected.

The power reception device 20 calculates the power reception amount Pr via the power reception amount detecting unit 27 and transmits the power reception amount Pr to the power transmission device 10.

If the relationship between the power transmission amount Pt and the calculated power transmission efficiency E1 lies in the operable region, the power transmission device 10 transmits normal power again. If the relationship between the power transmission amount Pt and the power transmission efficiency E1 does not lie in the operable region, it is determined that the relationship is deviated from the operable region, and the power transmission device 10 stops the power transmission.

If it is determined that the relationship between the power transmission amount Pt and the power transmission efficiency E1 is deviated from the operable region, the power transmission device 10 further stops the power transmission for the duration T6, and, then, at the time (D), transmits the inspection power again for the duration T7. The power reception device 20 changes the dummy load 72 and repeatedly performs detection of the power reception amount Pr and calculation of the power transmission efficiency E1.

In addition, for the duration T7, the time for detecting the power reception amounts for all the resistance values in the dummy load 72 is insufficient in some cases. In these cases, the duration T7 may be set to be long in advance. Alternatively, the power reception amounts for some resistance values allowable within the duration T7 may be detected, and the power reception amounts for the other resistance values may be detected for the next duration T7 after power transmission temporarily stops.

At the point (E), if it is determined that the relationship between the power transmission amount Pt and the power transmission efficiency E1 lies in the operable region, the power transmission device 10 transmits again power of 20 W which is normal power.

Effects of Second Embodiment

As described above, the power transmission apparatus according to the present embodiment includes the power transmission device 10 having the power transmission amount detecting unit 15 which transmits power and detects the power transmission amount Pt, the power transmission device communication unit 18 which communicates with the power reception device 20, and the power transmission device controller 17 which calculates the power transmission efficiency E1 from the power transmission amount Pt and the power reception amount Pr received from the power reception device 20, and stops transmitting power if it is determined that the relationship between the power transmission amount Pt and the power transmission efficiency E1 does not lie in the operable region, and, the power reception device 20 having the DC/DC unit 23 which receives power from the power transmission device 10 and converts a voltage, the load 24 to which power of which the voltage is converted by the DC/DC unit 23 is input, the dummy load 72 of which a load resistance value varies, the switch 71 which changes an output destination of the DC/DC unit 23 to either the load 24 or the dummy load 72, the power reception amount detecting unit 27 which detects the power reception amount Pr from output power of the DC/DC unit 23, the power reception device communication unit 28 which communicates with the power transmission device communication unit 18, and the power reception device controller 26 which transmits the power reception amount detected by the power reception amount detecting unit 27 to the power transmission device communication unit 18 via the power reception device communication unit 28, and varies the load resistance value of the dummy load 72 by controlling the switch 71 on the basis of an output voltage value of the DC/DC unit 23 detected by the power reception amount detecting unit 27.

Therefore, there is an effect that the power transmission efficiency E1 can be calculated accurately and starting and stopping of power transmission can be appropriately controlled even in a case where the power transmission efficiency E1 is calculated by transmitting the inspection power lower than the normal power.

Third Embodiment

Configuration of Power Transmission Apparatus

Figure 10:
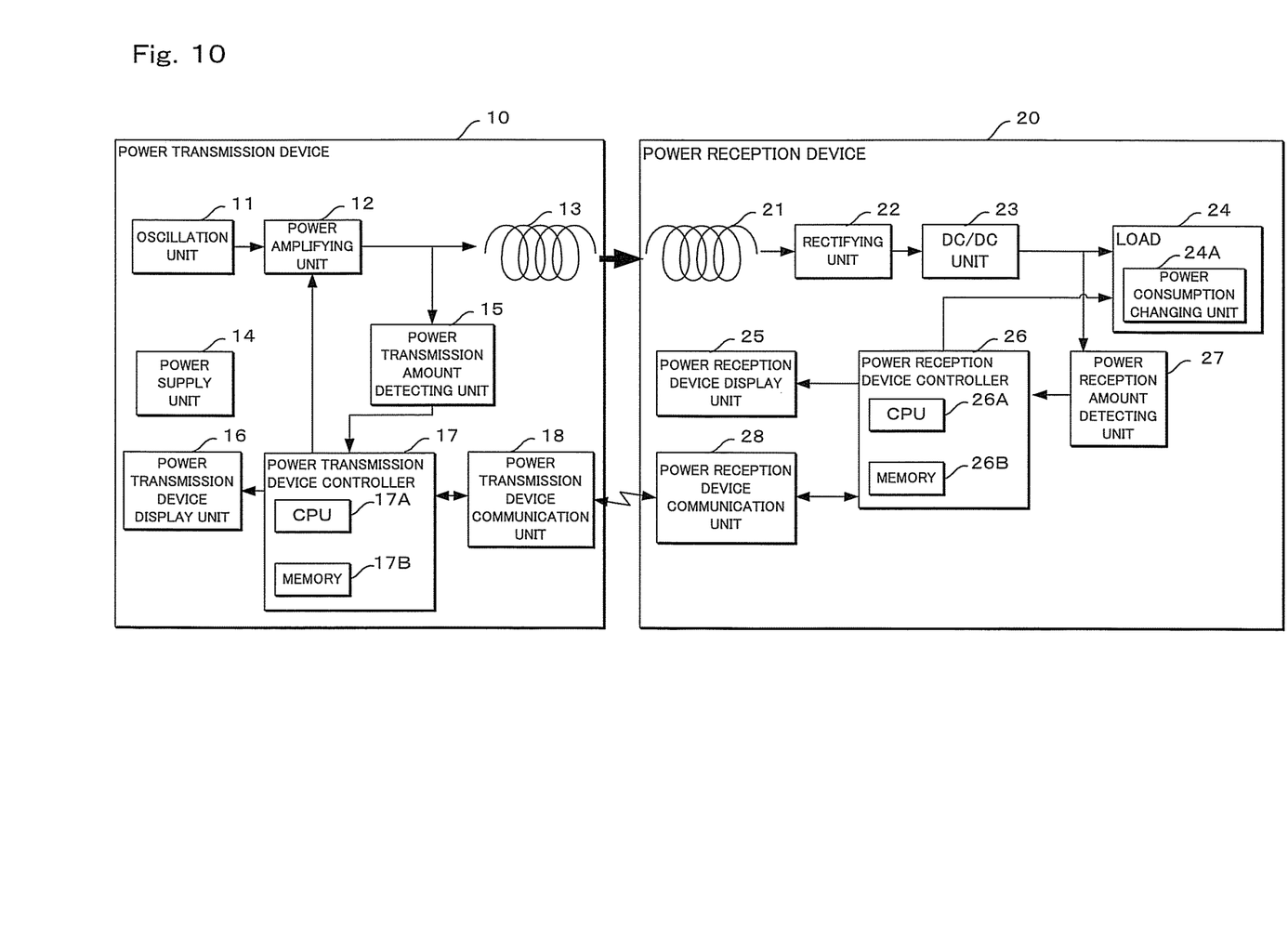
FIG. 10 is a block diagram illustrating a configuration of a power reception device of a power transmission apparatus according to a third embodiment.

FIG. 10 is a block diagram illustrating a configuration of a power transmission device 10 and a power reception device 20 of a power transmission apparatus according to the present embodiment. The power transmission apparatus includes the power transmission device 10 which transmits power and the power reception device 20 which receives the transmitted power. A configuration of the power transmission device 10 is the same as the configuration of the power transmission device 10 according to the first embodiment.

As shown in FIG. 10, the power transmission device 10 and the power reception device 20 transmit power using, for example, an electromagnetic induction method or a magnetic field resonance method. A transmission method of power is not limited thereto. Hereinafter, a case of transmitting power using the electromagnetic induction method or the magnetic field resonance method will be described.

The power transmission device 10 includes an oscillation unit 11 which generates a high frequency signal, a power amplifying unit 12 which amplifies the generated high frequency signal, a power transmission coil 13 which transmits power amplified by the power amplifying unit 12, a power transmission amount detecting unit 15 which detects a power transmission amount of the power amplified by the power amplifying unit 12, a power transmission device communication unit 18 which performs communication, and a power transmission device controller 17 which controls the power amplifying unit 12 on the basis of power transmission efficiency calculated from the power transmission amount input from the power transmission amount detecting unit 15 and a power reception amount input from the power transmission device communication unit 18, and generates a control signal for controlling an operation of the power reception device 20.

The power transmission device 10 further includes a power supply unit 14 which supplies power, and a power transmission device display unit 16 which displays information on the basis of an instruction from the power transmission device controller 17.

The power transmission amount detecting unit 15 extracts some of the power output from the power amplifying unit 12 using, for example, a directional coupler, and detects power, thereby detecting the power transmission amount. Alternatively, the power transmission amount detecting unit 15 has a resistor inserted in series or in parallel into an output end, and detects a power transmission current or a power transmission voltage from a voltage across the resistor, thereby detecting the power transmission amount.

The power transmission device controller 17 includes a CPU 17A which is an operating device and a memory 17B which is a storage device. The memory 17B stores a threshold value Th.

The power transmission device display unit 16 may be a liquid crystal display or an input and output device such as a touch panel.

The power transmission device communication unit 18 has an interface which communicates with a power reception device communication unit 28 using an electric signal such as an electric wave, or an optical signal.

The power transmission device controller 17 may be configured to start communication after authentication of a communication partner in order to perform communication via the power transmission device communication unit 18.

The power reception device 20 includes a power reception coil 21 which receives power, a rectifying unit which rectifies the power received by the power reception coil 21 into DC, a DC/DC unit 23 which converts a voltage, a load 24 having a power consumption changing unit 24A which changes power consumption of power of which the voltage is converted by the DC/DC unit 23, a power reception amount detecting unit 27 which detects a power reception amount from output power of the DC/DC unit 23, the power reception device communication unit 28 which communicates with the power transmission device communication unit 18, and a power reception device controller 26 which transmits the power reception amount detected by the power reception amount detecting unit 27 to the power transmission device communication unit 18 via the power reception device communication unit 28, and controls the power consumption changing unit 24A so as to change power consumption of the load 24 on the basis of a control signal received by the power reception device communication unit 28.

The power reception device 20 further includes a power reception device display unit 25 which displays information on the basis of an instruction from the power reception device controller 26.

The power reception amount detecting unit 27 detects power received by the power reception device 20 of power transmitted from the power transmission device 10. The power reception amount detecting unit 27 extracts, for example, a portion of an output of the DC/DC unit 23, and detects the power reception amount by detecting a power transmission current or a power transmission voltage from a voltage across a resistor inserted in series or in parallel into an output end.

The power reception device controller 26 includes a CPU 26A which is an operating device and a memory 26B which is a storage device.

The power reception device display unit 25 may be a liquid crystal display or may be an input and output device such as a touch panel.

The power reception device communication unit 28 has an interface which communicates with the power transmission device communication unit 18 using an electric signal such as an electric wave, or an optical signal.

The power reception device controller 26 may be configured to start communication after authentication of a communication partner in order to perform communication via the power reception device communication unit 28.

Operation of Power Transmission Apparatus

The power transmission device controller 17 calculates power transmission efficiency E1 from the power transmission amount detected by the power transmission amount detecting unit 15, and the power reception amount which is detected by the power reception amount detecting unit 27 and is received via the power transmission device communication unit 18. The power transmission device controller 17 controls the power amplifying unit 12 so as to reduce a power transmission amount Pt and controls the power consumption changing unit 24A so as to reduce power consumption of the load 24 if transmitted power which is not received exceeds a threshold value on the basis of the power transmission efficiency and the power transmission amount.

Figure 11:
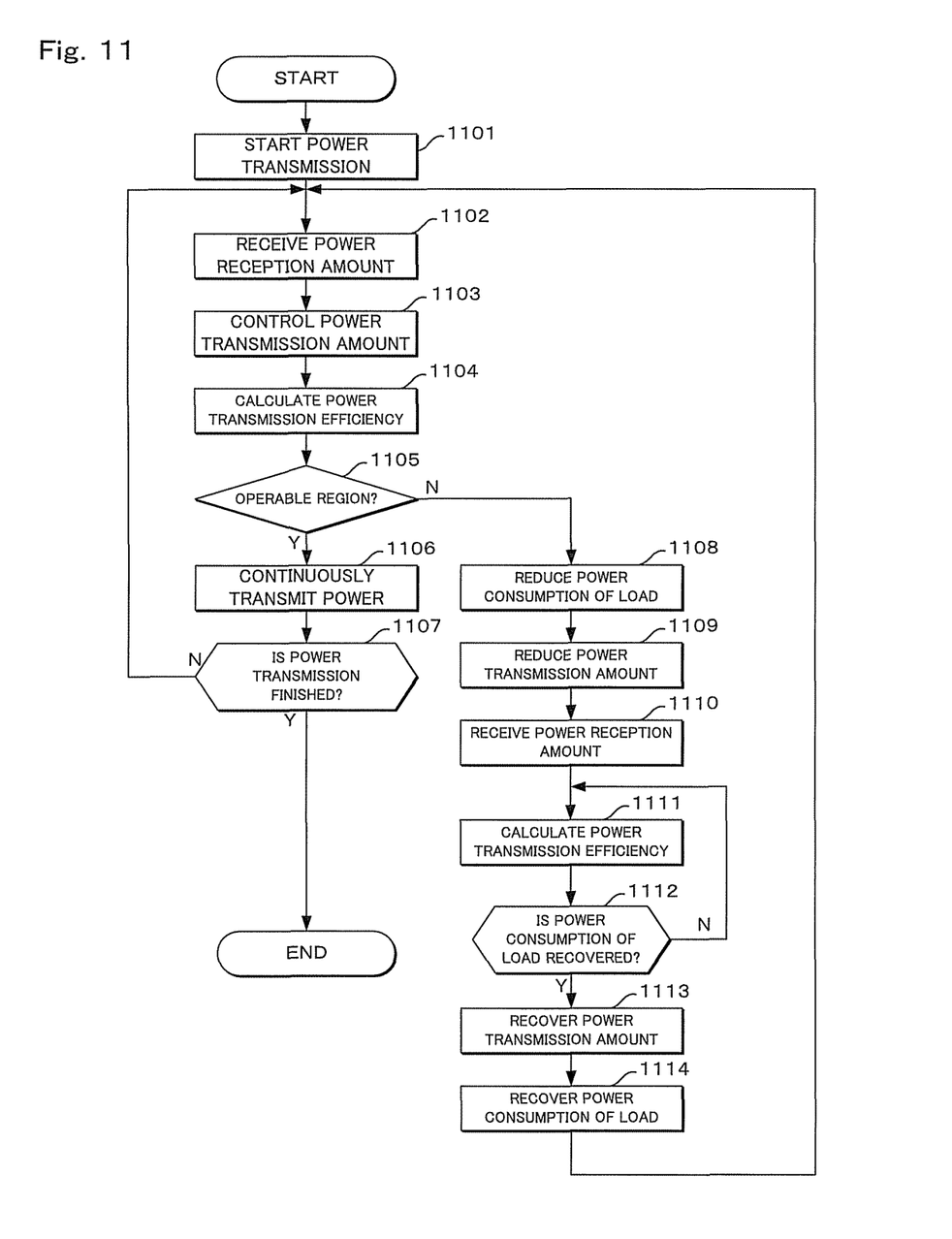
FIG. 11 is a flowchart illustrating an operation of a power transmission device.

FIG. 11 is a flowchart illustrating an operation of the power transmission device 10 of the power transmission apparatus. As shown in FIG. 11, in ACT 1101, the power transmission device 10 starts power transmission.

In ACT 1102, the power transmission device 10 receives a power reception amount Pr from, the power reception device 20 via the power transmission device communication unit 18.

In ACT 1103, the power transmission device 10 controls the power transmission amount, for example, as follows. The power transmission amount Pt is reduced in a range where the power reception amount Pr is not lower than an operation voltage of the load 24. If the power reception amount Pr is reduced, the power transmission amount Pt increases.

In ACT 1104, the power transmission device 10 calculates the power transmission efficiency E1 from the power transmission amount Pt and the power reception amount Pr.

In ACT 1105, the power transmission device 10 determines whether or not a relationship between the power transmission amount Pt and the power transmission efficiency E1 lies in an operable region. If it is determined that the relationship between the power transmission amount Pt and the power transmission efficiency E1 lies in the operable region, the power transmission device 10 proceeds to ACT 1106, and, if it is not in the operable region, the power transmission device 10 proceeds to ACT 1108.

In ACT 1106, the power transmission device 10 continuously transmits power.

In ACT 1107, the power transmission device 10 determines whether or not a condition for finishing power transmission is satisfied, for example, a signal indicating full charge is received. If it is determined that the condition for finishing power transmission is satisfied, the power transmission device 10 finishes the process, and if it is determined that the condition for finishing power transmission is not satisfied, the power transmission device 10 proceeds to ACT 1102.

For example, if the load 24 is a secondary battery, when the load 24 detects a current value indicating full charge, the load 24 transmits a signal indicating the full charge to the power reception device controller 26, and the power reception device controller 26 transmits the signal indicating the full charge to the power transmission device 10 via the power reception device communication unit 28. Alternatively, if the power reception amount detected by the power reception amount detecting unit 27 conforms to a power reception amount of a full charge state, the power reception device controller 26 may detect the full charge. When receiving the signal indicating the full charge, the power transmission device 10 stops the power transmission and finishes the process.

In ACT 1108, the power transmission device 10 transmits a control signal for reducing power consumption of the load to the power consumption changing unit 24A of the power reception device 20. The power consumption changing unit 24A receiving the control signal reduces the power consumption of the load.

For example, if the load 24 is a secondary battery which is being charged, control for reducing a charging current is performed so as to reduce the power consumption of the load. In addition, for example, if the load is an illumination lamp which is turned on, it is possible to reduce the power consumption of the load by lowering the illuminance thereof.

In ACT 1109, the power transmission device 10 reduces the power transmission amount such that a relationship between the power transmission amount Pt and the power transmission efficiency E1 enters the operable region. Since the control for reducing the power consumption of the load is already performed in ACT 1108, power required by the load can be supplied even if the power transmission amount Pt is reduced. There is a disadvantage in that, if a secondary battery is charged, the charging current is reduced, and, as a result, time for completion of the charging is lengthened, but there is no occurrence of failure in the system due to a shortage of the power required by the load.

In ACT 1110, the power transmission device 10 receives the power reception amount Pr from the power reception device 20 via the power transmission device communication unit 18.

In ACT 1111, the power transmission device 10 calculates the power transmission efficiency E1 from the power transmission amount Pt and the power reception amount Pr.

In ACT 1112, the power transmission device 10 determines whether or not the relationship between the power transmission amount Pt and the power transmission efficiency E1 lies in the operable region, and thereby determines whether or not the power consumption of the load can be recovered. If it is determined that the relationship between the power transmission amount Pt and the power transmission efficiency E1 lies in the operable region, the power transmission device 10 proceeds to ACT 1113, and, if not in the operable region, the power transmission device 10 proceeds to ACT 1111.

In ACT 1114, the power transmission device 10 recovers the power consumption of the load and returns to ACT 1102.

As such, if the power transmission efficiency E1 increases, it is possible to return the power transmission amount Pt or the power consumption of the load which is temporarily reduced to an original state.

Effects of Third Embodiment

As described above, the power transmission apparatus according to the present embodiment includes the power transmission device 10 having the power transmission amount detecting unit 15 which transmits power and detects the power transmission amount Pt, the power transmission device communication unit 18 which communicates with the power reception device 20, and the power transmission device controller 17 which calculates the power transmission efficiency E1 from the power transmission amount Pt and the power reception amount Pr received from the power reception device 20, and stops transmitting power if it is determined that the relationship between the power transmission amount Pt and the power transmission efficiency E1 does not lie in the operable region, and, the power reception device 20 having the DC/DC unit 23 which receives power from the power transmission device 10 and converts a voltage, the load 24 to which power of which the voltage is converted by the DC/DC unit 23 is input, the power consumption changing unit 24A which changes power consumption of the load, the power reception amount detecting unit 27 which detects the power reception amount Pr from output power of the DC/DC unit 23, the power reception device communication unit 28 which communicates with the power transmission device communication unit 18, and the power reception device controller 26 which transmits the power reception amount detected by the power reception amount detecting unit 27 to the power transmission device communication unit 18 via the power reception device communication unit 28, and varies the power consumption of the load on the basis of a control signal received by the power reception device communication unit 28.

Therefore, there is an effect that, even if the power transmission efficiency E1 is reduced, it is possible to suppress a power transmission loss P1 to a regulated value or less without stopping power transmission and to thereby realize stable and safe power transmission.

Fourth Embodiment

Configuration of Power Transmission Apparatus

A configuration of a power transmission apparatus according to the present embodiment may employ the configurations of the power transmission apparatus according to the first to third embodiments.

In the present embodiment, the power transmission device 10 further includes the following configuration.

Figure 12:
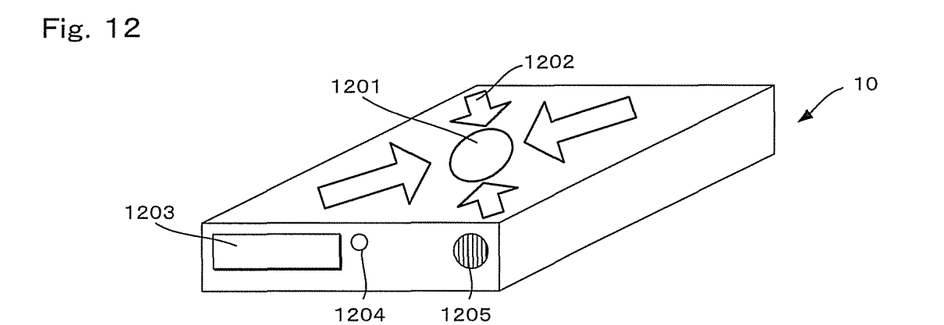
FIG. 12 is an exterior perspective view of a power transmission device according to a fourth embodiment.

FIG. 12 is an exterior perspective view of the power transmission device 10 according to the present embodiment. As shown in FIG. 12, the power transmission device 10 includes a placed position display unit 1201 which indicates a placed position of the power reception device 20, a placed position correction display unit 1202 which displays prompting to correct a placed position of the power reception device 20, a display unit 1203 which displays information, a warning lamp 1204 which issues warning, and a speaker 1205 which emits a sound.

The placed position display unit 1201, the placed position correction display unit 1202, and the warning lamp 1204 may use a lamp such as an LED. The placed position display unit 1201 and the placed position correction display unit 1202 are provided on the surface of the power transmission device 10 on which the power reception device 20 is placed.

The warning lamp 1204 and the display unit 1203 are provided on the front surface of the power transmission device 10.

Operation of Power Transmission Apparatus

An operation of the power transmission apparatus according to the present embodiment may employ the operations of the power transmission apparatuses according to the first to third embodiments.

In the present embodiment, the power transmission apparatus further performs the following operation.

If it is determined that the relationship between the power transmission amount Pt and the power transmission efficiency E1 lies out of the operable region, the power transmission device 10 turns on or blinks the placed position display unit 1201 and the placed position correction display unit 1202 on and off.

If it is determined that the relationship between the power transmission amount Pt and the power transmission efficiency E1 lies in the operable region, the power transmission device 10 turns off the placed position display unit 1201 and the placed position correction display unit 1202.

If it is determined that the relationship between the power transmission amount Pt and the power transmission efficiency E1 lies out of the operable region, the power transmission device 10 may turn on or blinks the warning lamp 1204 on and off, and may issue a warning for prompting to place the power reception device 20 again by a sound from the speaker 1205.

If it is determined that the relationship between the power transmission amount Pt and the power transmission efficiency E1 lies in the operable region, the power transmission device 10 turns off the warning lamp 1204, and stops the warning for prompting to place the power reception device 20 again by the sound from the speaker 1205.

Figure 13:
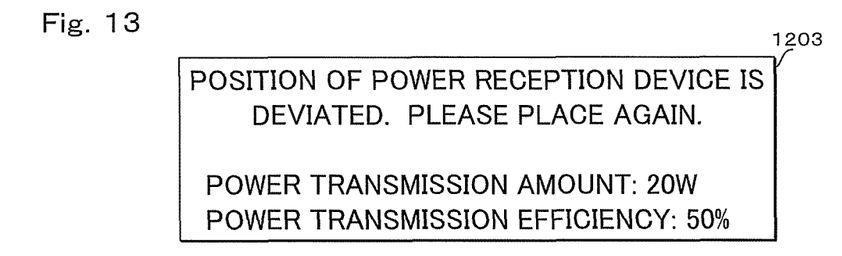
FIG. 13 is a diagram illustrating a display example of a display device.

FIG. 13 is a diagram illustrating a display example of the display unit 1203. As shown in FIG. 13, if it is determined that the relationship between the power transmission amount Pt and the power transmission efficiency E1 lies out of the operable region, the power transmission device 10 displays prompting to place the power reception device 20 again on the display unit 1203.

In this case, the power transmission device 10 displays, for example, "The position of the power reception device is deviated. Please place again".

The power transmission device 10 may display the power transmission amount Pt and the power transmission efficiency E1 on the display unit 1203.

Figure 14:
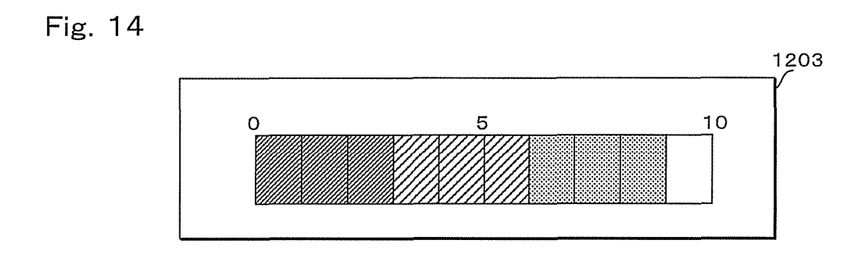
FIG. 14 is a diagram illustrating a display example.

FIG. 14 is a diagram illustrating a display example of the display unit 1203. As shown in FIG. 14, the power transmission device 10 may display the power transmission efficiency E1 which is divided into levels on the display unit 1203.

FIG. 14 shows an example where the power transmission efficiency E1 is divided into ten levels, and is further classified into three steps of a high level, an intermediate level, and a low level by colors. The power transmission device 10 displays the power transmission efficiency E1 on the display unit 1203 such that, for example, 60% is set to the level 10, a range between 0% and 60% is equally divided into ten levels, and a corresponding level is displayed.

Figure 15:
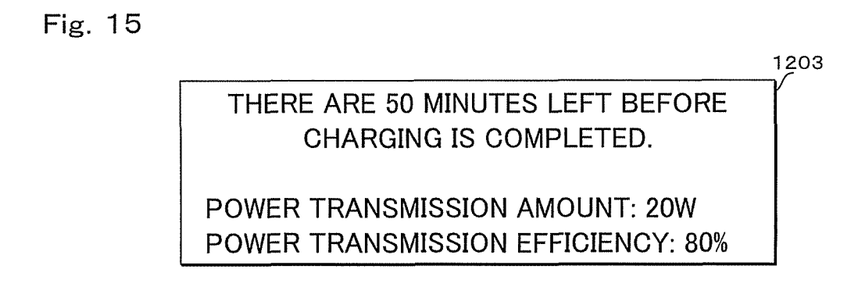
FIG. 15 is a diagram illustrating another display example.

FIG. 15 is a diagram illustrating another display example of the display unit 1203. As shown in FIG. 15, the power transmission device 10 may calculate time left before charging is completed and may display the time left on the display unit 1203.

In relation to the calculation of the time left, the time for full charge is stored in the memory 17B of the power transmission device 10 in advance, and the time left is calculated based on the time for full charge and the power transmission efficiency E1 or the power reception amount Pr.

In addition, the power reception device 20 may perform, on the power reception device display unit 25, such display as is performed on the display unit 1203 by the power transmission device 10.

In this case, the power transmission device controller 17 may generate information to be displayed on the power reception device display unit 25 so as to be transmitted via the power transmission device communication unit 18, and, for example, time left before charging is completed may be calculated by the power reception device controller 26.

The power reception device 20 receives the information via the power reception device communication unit 28, and the power reception device controller 26 displays the information on the power reception device display unit 25.

Effects of Fourth Embodiment

As described above, the power transmission apparatus according to the present embodiment includes the power transmission device 10 having the placed position display unit 1201 which indicates a placed position of the power reception device 20, the placed position correction display unit 1202 which displays prompting to correct a placed position of the power reception device 20, the display unit 1203 which displays information, the warning lamp 1204 which issues warning, and the speaker 1205 which utters a sound.

Therefore, there is an effect that a user can easily determine whether or not the relationship between the power transmission amount Pt and the power transmission efficiency E1 lies in the operable region, that is, a setting method of the power reception device 20 in the power transmission device 10 is appropriate.

While certain embodiments have been described, these embodiments have been presented by way of example only, and are not intended to limit the scope of the inventions. Indeed, the novel methods and apparatuses described herein may be embodied in a variety of other forms; furthermore, various omissions, substitutions and changes in the form of the methods and systems described herein may be made without departing from the spirit of the inventions. The accompanying claims and their equivalents are indeed to cover such forms or modifications as would fall within the scope and spirit of the inventions.

What is claimed is:

1. A power transmission apparatus comprising:
a power transmission device including a power transmission unit that transmits power, a power transmission amount detecting unit that detects a power transmission amount transmitted by the power transmission unit, a power transmission device communication unit that performs communication, and
a power transmission device controller that controls power transmission of the power transmission unit on the basis of power transmission efficiency calculated from the power transmission amount and a power reception amount; and
a power reception device including a power reception unit that receives power, a power reception amount detecting unit that detects the power reception amount from output power of the power reception unit, a power reception device communication unit that communicates with the power transmission device communication unit, a power reception device controller that transmits the power reception amount to the power transmission device via the power reception device communication unit, a dummy load of which a load resistance value varies, and a switch that changes an output from the power reception unit to either a load or a dummy load,
wherein the power transmission device controller stops transmitting power and makes the power reception device controller vary a resistance value of the dummy load so as to transmit the power reception amount to the power transmission device if it is determined that a relationship between the power transmission amount and the power transmission efficiency causes a power transmission loss exceeding a threshold value.

2. The apparatus according to claim 1, wherein the power transmission device controller stops transmitting power if it is determined that a relationship between the power transmission amount and the power transmission efficiency causes a power transmission loss exceeding a threshold value.

3. The apparatus according to claim 1, wherein the power reception device further includes a power consumption changing unit that varies power consumption of a load, and
wherein the power transmission device controller makes the power consumption changing unit vary the power consumption of the load so as to transmit the power reception amount if a relationship between the power transmission amount and the power transmission efficiency causes a power transmission loss exceeding a threshold value.

4. A power transmission apparatus comprising:
a power transmission device including a power transmission unit that transmits power, a power transmission amount detecting unit that detects a power transmission amount transmitted by the power transmission unit, a power transmission device communication unit that performs communication, a placed position correction display unit on a surface on which the power reception device is placed, and
a power transmission device controller that controls power transmission of the power transmission unit on the basis of power transmission efficiency calculated from the power transmission amount and a power reception amount; and
a power reception device including a power reception unit that receives power, a power reception amount detecting unit that detects the power reception amount from output power of the power reception unit, a power reception device communication unit that communicates with the power transmission device communication unit, and a power reception device controller that transmits the power reception amount to the power transmission device via the power reception device communication unit,
wherein the power transmission device controller lights the placed position correction display unit if it is determined that a relationship between the power transmission amount and the power transmission efficiency causes a power transmission loss exceeding a threshold value.

5. The apparatus according to claim 4, wherein the power transmission device further includes a display unit, and
wherein the power transmission device controller displays the power transmission amount on the display unit of the power transmission device.

6. The apparatus according to claim 4, wherein the power reception device further includes a display unit, and
wherein the power reception device controller displays the power reception amount on the display unit of the power reception device.

7. A power transmission apparatus comprising:
a power transmission device including a power transmission unit that transmits power, a power transmission amount detecting unit that detects a power transmission amount transmitted by the power transmission unit, a power transmission device communication unit that performs communication, a speaker that utters a sound, and
a power transmission device controller that controls power transmission of the power transmission unit on the basis of power transmission efficiency calculated from the power transmission amount and a power reception amount; and
a power reception device including a power reception unit that receives power, a power reception amount detecting unit that detects the power reception amount from output power of the power reception unit, a power reception device communication unit that communicates with the power transmission device communication unit, and a power reception device controller that transmits the power reception amount to the power transmission device via the power reception device communication unit,
wherein the power transmission device controller makes the speaker utter the sound if it is determined that a relationship between the power transmission amount and the power transmission efficiency causes a power transmission loss exceeding a threshold value.

8. The apparatus according to claim 7, wherein the power transmission device further includes a display unit, and
wherein the power transmission device controller displays the power transmission amount on the display unit of the power transmission device.

9. The apparatus according to claim 7, wherein the power reception device further includes a display unit, and
wherein the power reception device controller displays the power reception amount on the display unit of the power reception device.

* * * * *